US012751464B2

(12) United States Patent
Cathey et al.

(10) Patent No.: US 12,751,464 B2
(45) Date of Patent: Oct. 6, 2026

(54) DECONTAMINATION TANK AND METHOD FOR TREATING FOOD PRODUCTS

(71) Applicant: Morris & Associates, Inc., Garner, NC (US)

(72) Inventors: Robert E. Cathey, Apex, NC (US); William F. Morris, III, Raleigh, NC (US); David H. Macaluso, Benson, NC (US); John P. Shell, Raleigh, NC (US)

(73) Assignee: Morris & Associates, Inc., Garner, NC (US)

( * ) Notice: Subject to any disclaimer, the term of this patent is extended or adjusted under 35 U.S.C. 154(b) by 612 days.

(21) Appl. No.: 17/994,208

(22) Filed: Nov. 25, 2022

(65) Prior Publication Data

US 2023/0165284 A1 Jun. 1, 2023

Related U.S. Application Data

(60) Provisional application No. 63/283,943, filed on Nov. 29, 2021.

(51) Int. Cl.

*A22C 17/08* (2006.01)
*A22B 5/00* (2006.01)
*A22C 21/00* (2006.01)
*A23B 2/00* (2025.01)
*A23B 2/788* (2025.01)

(Continued)

(52) U.S. Cl.

CPC ............ *A23B 2/792* (2025.01); *A22B 5/0076* (2013.01); *A22B 5/0082* (2013.01); *A22C 17/08* (2013.01); *A22C 21/0061* (2013.01); *A23B 2/001* (2025.01); *A23B 2/788* (2025.01); *A23B 2/80* (2025.01)

(58) Field of Classification Search

CPC ..... A22B 5/0076; A22B 5/0082; A22C 17/08; A22C 17/16; A22C 21/0061

USPC .................................................. 452/123, 173

See application file for complete search history.

(56) References Cited

U.S. PATENT DOCUMENTS 3,410,101 A * 11/1968 Morris, Jr. .............. F28C 3/005 62/375
5,484,332 A * 1/1996 Leech ...................... A23B 4/28 452/77

(Continued)

*Primary Examiner* — David J Parsley

(74) *Attorney, Agent, or Firm* — Womble Bond Dickinson (US) LLP

(57) ABSTRACT

Disclosed are various embodiments for a decontamination tank and method for treating reducing microbial contamination of a food product. In one embodiment, decontamination tank comprises a first chamber for holding a first antimicrobial bearing liquid for reducing a microbial contamination on a surface of the food product. The decontamination tank further comprises a second chamber for holding a second antimicrobial bearing liquid of different content than the first antimicrobial bearing liquid in the first chamber, for further reducing the microbial contamination on the surface of the food product. The decontamination tank further comprises a first unloader configured to remove the food product from the first antimicrobial bearing liquid in the first chamber and to deposit the food product toward the second chamber. The decontamination tank further comprises a second unloader configured to remove the food product from the second antimicrobial bearing liquid in the second chamber.

17 Claims, 10 Drawing Sheets

(51) Int. Cl.

| | |
|---|---|
| ***A23B 2/792*** | (2025.01) |
| ***A23B 2/80*** | (2025.01) |

(56) References Cited

U.S. PATENT DOCUMENTS

| | | | | | |
|---|---|---|---|---|---|
| 5,939,115 | A * | 8/1999 | Kounev | A23B 4/015 134/131 | |
| 6,865,895 | B2 * | 3/2005 | Bass | A23B 4/062 62/375 | |
| 7,281,384 | B2 * | 10/2007 | Morris, III | F25D 13/065 62/375 | |
| 7,470,173 | B2 * | 12/2008 | Morris, III | A22C 21/0061 452/173 | |
| 7,527,550 | B1 * | 5/2009 | Leech | A22C 17/08 452/81 | |
| 7,588,489 | B2 * | 9/2009 | Morris, III | A22C 21/0061 452/173 | |
| 9,295,270 | B2 * | 3/2016 | Miller | F28C 3/005 | |
| 9,841,245 | B1 * | 12/2017 | Wright | A23B 4/064 | |

* cited by examiner

DECONTAMINATION TANK AND METHOD FOR TREATING FOOD PRODUCTS

CROSS-REFERENCE TO RELATED APPLICATIONS

This application claims priority to and the benefit of U.S. Provisional Application No. 63/283,943, filed on Nov. 29, 2021 and entitled "DECONTAMINATION TANK AND METHOD FOR TREATING FOOD PRODUCTS," the entire contents of which is incorporated herein by reference.

BACKGROUND

In the processing of poultry, particularly chickens, the industry has had to deal with problems concerning bacterial contamination of the processed birds. During the process of dressing poultry, the birds are susceptible to contamination, self-inflicted and cross-contamination by the handling of the mass of birds in a typical day. The bacteria may arrive at the facility clinging to and growing on the exposed surfaces of the live birds, including in the feather follicles. Evisceration of the birds creates an opportunity for microbes to contaminate freshly exposed muscle and other internal tissues. The problem may be somewhat mitigated at the processing stage where the birds are being chilled in an immersion chiller, wherein the birds are chilled from approximately normal body temperature down to the mid thirty degrees Fahrenheit. At this stage, liquid in the chiller may wash off some contamination. However, unacceptable levels of contamination may remain on the product.

Some of the common pathogenic bacteria found in poultry are *Salmonella, E. coli* and others. While antiseptic additives may be included in the liquid of the chiller for a significant reduction of the bacteria, there is a hazard that bacteria may be passed with the birds on to the marketplace where the dressed products are distributed to the public. Fortunately, poultry products typically are cooked thoroughly and the bacteria are eradicated during the cooking process. However, there still is a hazard of the bacteria may be passed on to the public, for instance by handling raw products.

While the addition of antibacterial substances to the liquid in the chiller have had success in reducing the surface bacteria on poultry carcasses, most procedures are not successful in removing all pathogenic bacteria from the contaminated carcasses. For example, it is more difficult to vigorously apply the liquid and its antibacterial contents to the cavities of the birds and to the feather follicles of the birds and these areas of the birds might retain more bacteria than other portions of the birds.

Because of the need to reduce the temperature of the birds while in the chiller tank, the birds require a long dwell time in the chilled liquid. Because of the long dwell time the concentration of the antibacterial substances in the liquid cannot be very high so as to avoid organoleptic degradation of the product that produces unacceptable changes in taste, aroma, appearance, or texture.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a decontamination tank with improved efficacy to decontaminate food products. The decontamination tank can be used, for example, to apply anti-microbial solutions to food products. In some examples, treatment in the decontamination tank can precede or follow treatment of the food products in a chiller. In various embodiments, a decontamination tank has a plurality of chambers so that the product can be subjected to treatment via a series of different anti-microbial solutions. In various embodiments, a decontamination tank has one or more pumps or other liquid flow components integrated into the tank to circulate or pump an anti-microbial solution past the product at a high flow rate with a low pressure drop. In some embodiments, a decontamination tank with a plurality of chambers can include one or more integrated liquid flow components.

The United States Department of Agriculture (USDA) continues to push poultry processors to reduce the quantity of microbial contaminants in the food supply offered to the public. Antimicrobial agents such as peracetic acid (PAA), cetylpyridinium chloride (CPC), chlorine, ozone, or salt are more or less effective against various species of microbes including *Salmonella, Campylobacter, E. coli*, and *Listeria*. It may be desirable to use a combination of antimicrobial agents to treat a broad spectrum of contaminants. However, if two or more antimicrobial agents are mixed in a common solution, there is a potential that they will react or interfere and thereby degrade efficacy.

The efficacy of each type of antimicrobial solution can be generally enhanced by providing more aggressive agitation of the food product within the solution. Previous attempts to agitate the solution using external pipes can require relatively high-powered pumps that are difficult to clean. Furthermore, since the tanks are relatively compact to begin with, arranging for flow to return to the pump inlet can be challenging when the entire volume of liquid in the tank is being circulated every minute or two.

Attempts to agitate with air injected directly into the solution sometimes create undesirable foam in the tank. Furthermore, some antimicrobial agents can off-gas into the agitation air creating a personnel hazard around the treatment system when the agitation air leaves the tank.

Figure 1:
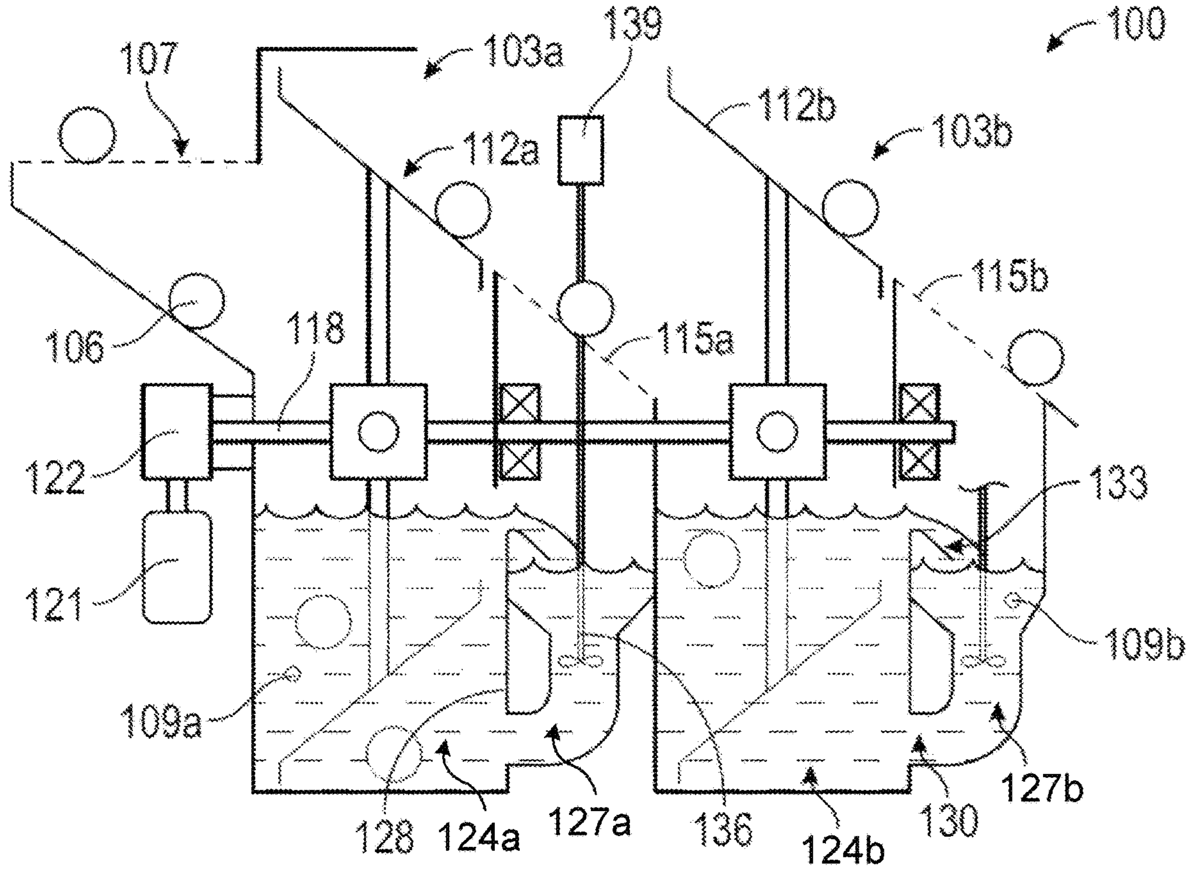
FIG. 1 is a longitudinal section view of a decontamination tank with a plurality of chambers according to various embodiments of the present disclosure.
Figure 7:
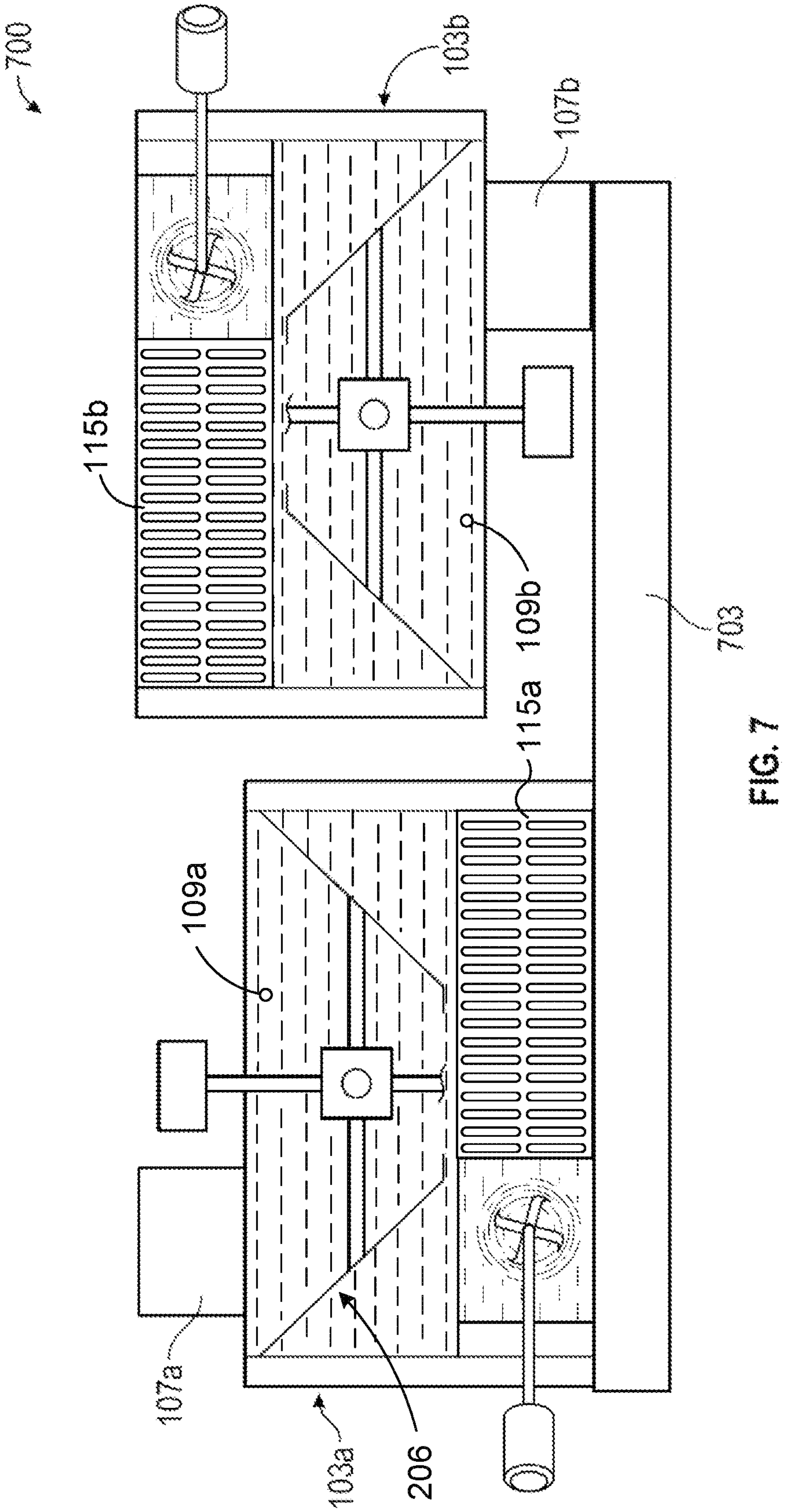
FIG. 7 is a top view of a decontamination tank with a plurality of chambers in a side-by-side arrangement according to various embodiments of the present disclosure.

Various embodiments of the present disclosure comprise a decontamination tank having a series of chambers for holding liquid(s) and unloaders for lifting product out of the chambers. FIG. 1 is a longitudinal section view of a decontamination tank 100 with a plurality of chambers 103*a* and 103*b* according to various embodiments of the present disclosure. The chambers 103*a* and 103*b* can be oriented axially in series as shown in FIG. 1 or can be oriented laterally in a side-by-side arrangement as shown in FIG. 7.

Food product 106, such as edible portions of poultry, vegetables, fruits, or other types of food products, is deposited into a first chamber 103*a* of the decontamination tank 100 via an inlet chute 107. The first chamber 103*a* contains a first liquid 109*a* such as an antimicrobial solution. A first unloader 112*a* located in the first chamber 103*a* lifts the product 106 out of the first chamber 103*a* and deposits the product 106 onto a first discharge chute 115*a* conveying to a second chamber 103*b*. In some embodiments, one or more belts or chutes can be used to transfer the food product 106 from the unloader 112*a* to the second chamber 103*b*. The second chamber 103*b* can be sealed from the first chamber 103*a* to prevent the liquids 109 (e.g., liquids 109*a*, 109*b*) contained in the respective chambers 103 (e.g., chambers 103*a*, 103*b*) from mixing.

The second chamber 103*b* can contain a second liquid 109*b* of a composition different from the liquid 109*a* in the first chamber 103*a*. A difference in composition can be: (a) a difference in chemical species in solution, (b) a difference in concentration of the same chemical species, (c) both (a) and (b), or (d) negligible concentrations of any active ingredient in one of the liquids 109. For example, the liquids 109 can differ in pH content such that mixing the liquids 109 together would render one or both to be less effective or ineffective. Also, the order of treatment may be significant. That is, it may be required or preferable that the food product 106 be treated with a first liquid 109*a* before being treated with a second liquid 109*b* instead of being treated with the second liquid 109*b* before being treated with the first liquid 109*a*. A second unloader 112*b* in the second chamber 103*b* lifts the product 106 out of the second chamber 103*b* and deposits it onto a second discharge chute 115*b* that directs the product 106 away from the second chamber 103*b*. The rotational speed of the unloaders 112 can be selected based upon an optimal treatment time for each of the respective liquids 109. The time that a liquid 109 remains on the product 106 before the liquid 109 drains off or is rinsed off may count toward the time of the treatment.

The decontamination tank 100 may comprise more than two chambers 103 and two unloaders 112. The unloaders 112 may be driven by individual motors. In other embodiments, some or all of the unloaders 112 may be coupled by one or more drive shafts 118 and driven by a single motor 121. A speed reducer 122 may be used to convert the rotational speed of the motor 121 into a lower rotational speed with higher torque for the drive shaft 118. The selected rotational speed for can be achieved using a speed reducer 120 for a particular unloader 112. In various embodiments, the chambers 103 of the decontamination tank 100 may correspond to distinct tank units that are coupled together.

Figure 8:
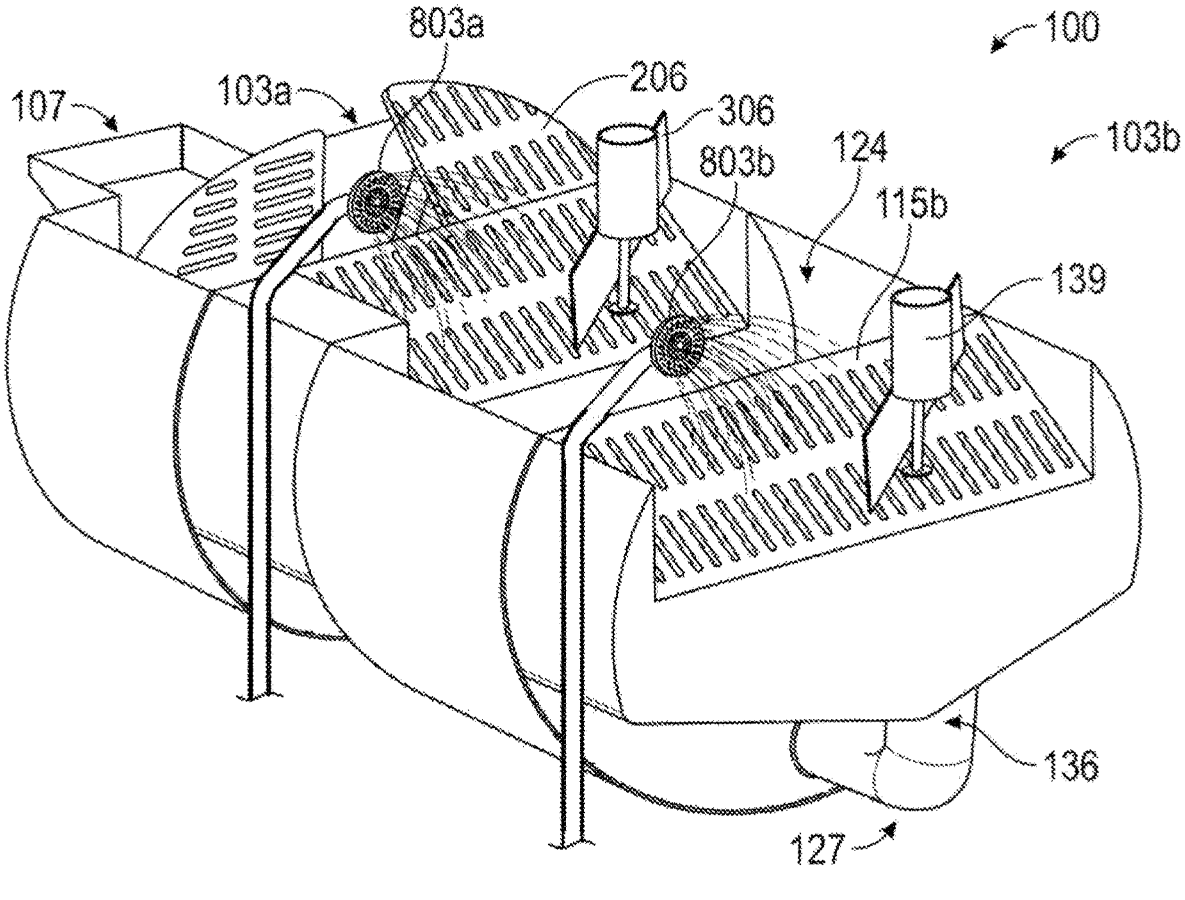
FIG. 8 is a perspective view of the decontamination tank of FIG. 1 with the addition of sprayers for rinsing according to various embodiments of the present disclosure.

In some embodiments, the product 106 is rinsed with a rinsing solution such as water between immersion in a first antimicrobial solution and a second antimicrobial solution. The rinsing solution is selected to rinse or neutralize the first antimicrobial solution and/or the second antimicrobial solution. Such rinsing may take place in a separate rinse chamber 103 interposed between the first chamber 103*a* and the chamber 103*b*. The separate rinse chamber 103 may be similar in construction to treatment chambers 103 described above. In other embodiments, rinsing may take the form of sprays of water or a waterfall directed at the product 106 on the first discharge chute 115*a* before the product 106 enters the second chamber 103*b*, as shown in the example of FIG. 8. In some embodiments, the rinsing agent may be air as when an air knife is used to blow excess liquid 109*a* off the product as it transfers to the second chamber 103*b*.

In some embodiments, each chamber 103 (e.g., chambers 103*a*, 103*b*) may be divided into a product area 124 (e.g., product areas 124*a*, 124*b*) and an overflow or recirculation area 127 (e.g., recirculation areas 127*a*, 127*b*) separated by a respective partition 128. Generally, a liquid 109 can be pumped from an overflow area 127 through one or more passages 130 in a partition 128 to a product area 124. Liquid 109 may overflow a weir 133 (i.e., an opening) in or on the partition 128 to return to the overflow area 127. In some examples, liquid 109 may flow through a screen positioned in an opening or weir 133 in or on the partition 128 to prevent product 106 from entering the overflow area 127. In either of these embodiments, the discharge chute 115 extends from the partition 128 to the next chamber 103 or the outlet of the decontamination tank 100. The discharge chute 115 can be perforated to allow any liquid 109 discharged with the product 106 from the unloader 112 to drain into the overflow area 127, rather than spill over into the next chamber 103.

In various embodiments, the decontamination tank 100 may include a respective liquid flow component 136 integrated into a corresponding chamber 103 to move or recirculate the liquid 109 from the overflow area 127 to the product area 124. The liquid flow component 136 can refer to various types of pumps, a fan or propeller driven pump or component, an impeller driven pump or component, or another type of component that pumps, moves, or circulates liquid 109. The respective liquid flow component 136 may be driven by a respective motor 139, such as a motor that drives a propeller, impeller, etc., to cause a pumping force, or a pump motor. In other embodiments, one or more external pumps may be used to circulate the liquid 109 in a corresponding chamber 103. In some cases, a separate liquid flow component 136 may be in each chamber 103. Where multiple liquid flow components 136 are used, the liquid flow components 136 may be driven by individual motors 139 or by a single motor 139 coupled to a common driveshaft. While various components and contents of the decontamination tank 100 can be described with respect to a particular one of the chambers 103, each of the respective chambers 103 can include a corresponding component as described.

Figure 2:
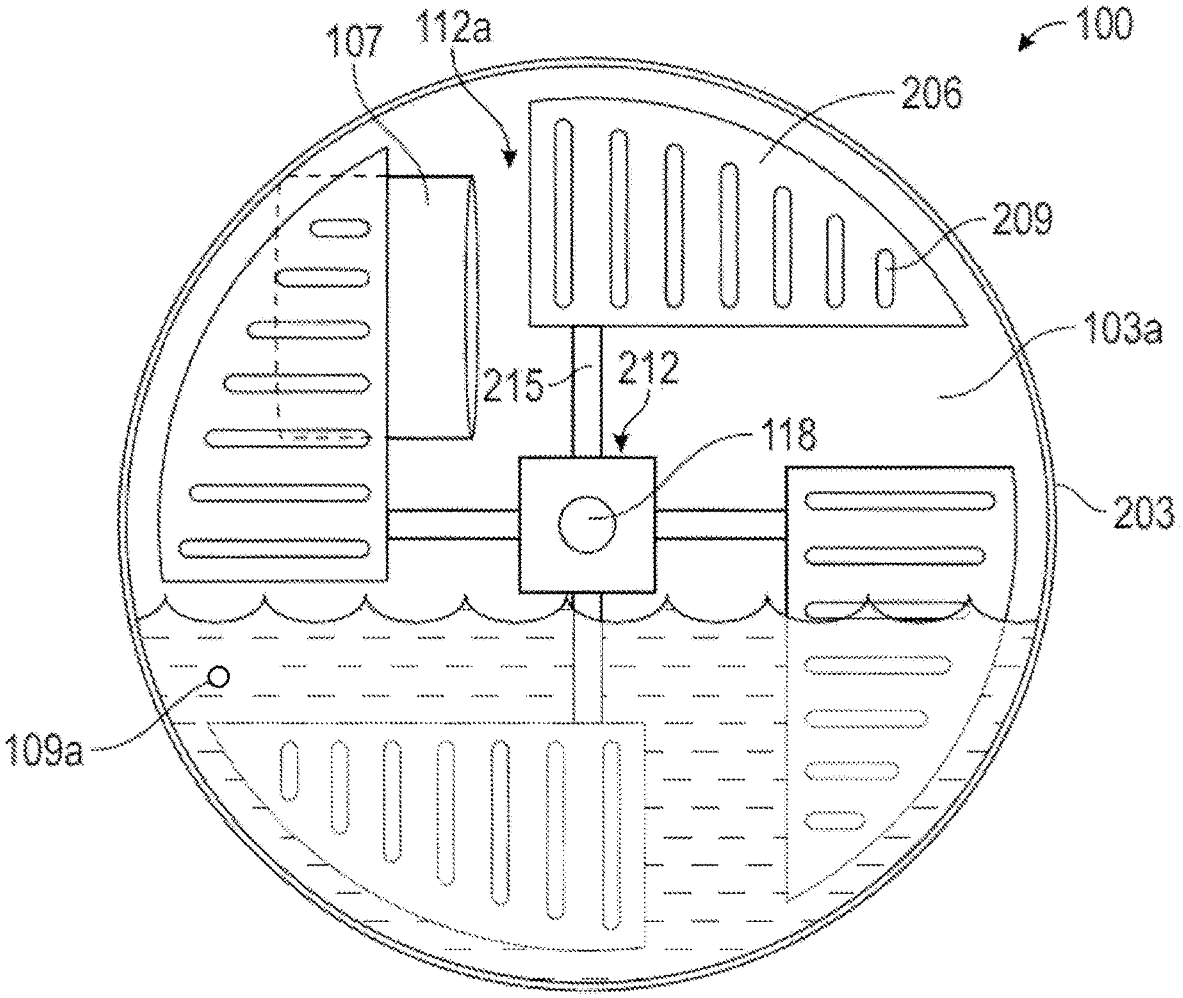
FIG. 2 is a cross-sectional view of the decontamination tank of FIG. 1 through a product area according to various embodiments of the present disclosure.

FIG. 2 is a cross-sectional view of the decontamination tank 100 through a product area 124 (FIG. 1) of a chamber 103*a* according to various embodiments of the present disclosure. FIG. 2 illustrates the inlet chute 107, and the chamber wall 203 enclosing the liquid 109*a*. The unloader 112*a* as depicted may rotate in a counterclockwise direction to draw the product 106 (FIG. 1) through the liquid 109*a* and then up and out of the liquid 109*a* for subsequent processing. The windmill-type unloader 112*a* as shown may have a plurality of unloader paddles 206, which may have one or more openings 209 that allow liquid 109*a* but not product 106 to pass through. Each unloader paddle 206 may be coupled to the drive shaft 118 at a hub 212 via a respective arm 215.

Figure 3:
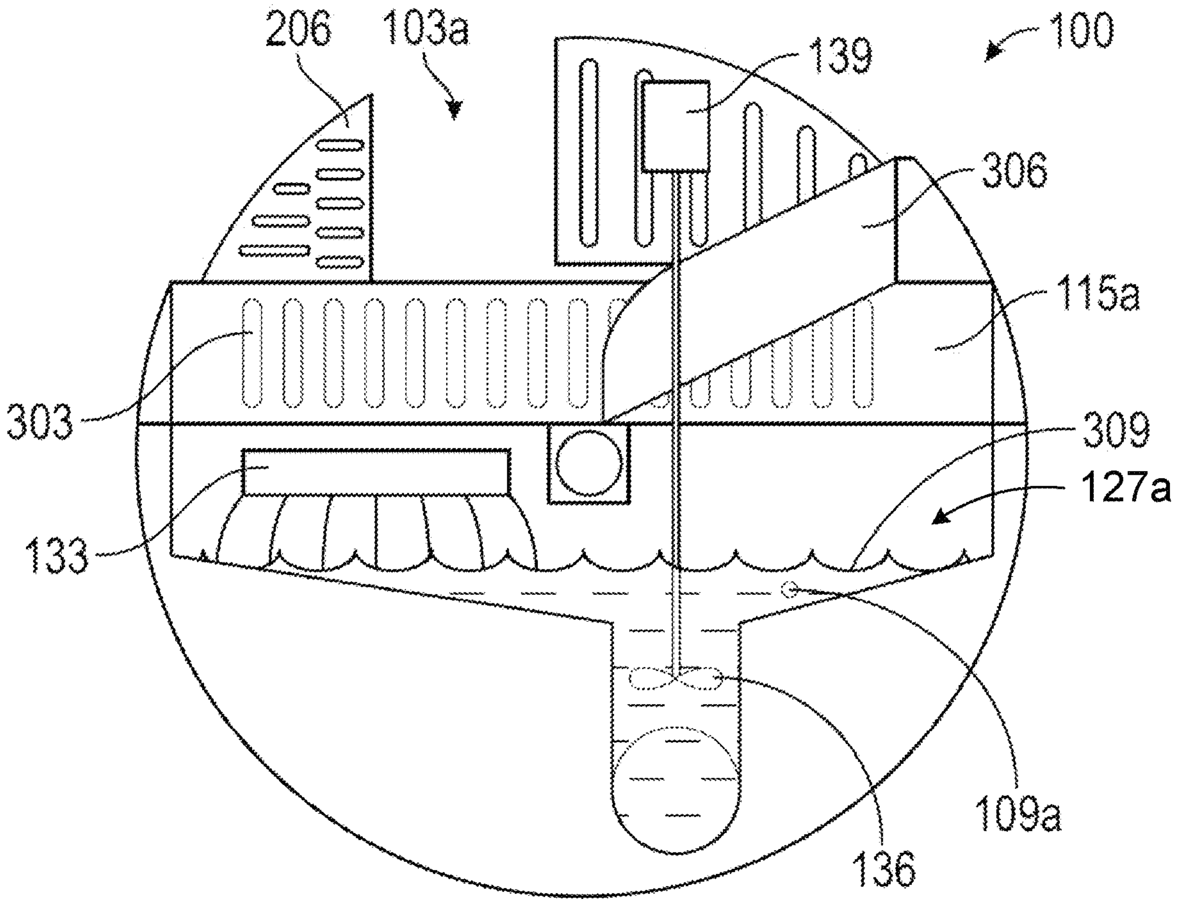
FIG. 3 is a cross-sectional view of the decontamination tank of FIG. 1 through an overflow area according to various embodiments of the present disclosure.

FIG. 3 is a cross-sectional view of the decontamination tank 100 through an overflow area 127*a* (see FIG. 1) of a chamber 103*a* according to various embodiments of the present disclosure. Portions of the unloader paddles 206 are visible in FIG. 3, and the unloader paddles 206 bring product 106 (FIG. 1) up to the discharge chute 115*a*. The discharge chute 115*a* may have one or more drainage openings 303 to allow the liquid 109*a* to drain through. Also, a deflector 306 may be present to guide the product 106 across the discharge chute 115 to the opposite side of the chamber 103*a*. The motor 139 and the liquid flow component 136 are also visible in FIG. 3. The liquid 109*a* enters the overflow area 127*a* via the weir 133, and the liquid level 309 as shown in the overflow area 127*a* may be below that of the product area 124*a*, where the liquid 109*a* exits the product area 124*a* (FIG. 1) via the weir 133. The liquid level of the product area 124*a* can be at or above the bottom of the weir 133.

Figure 4:
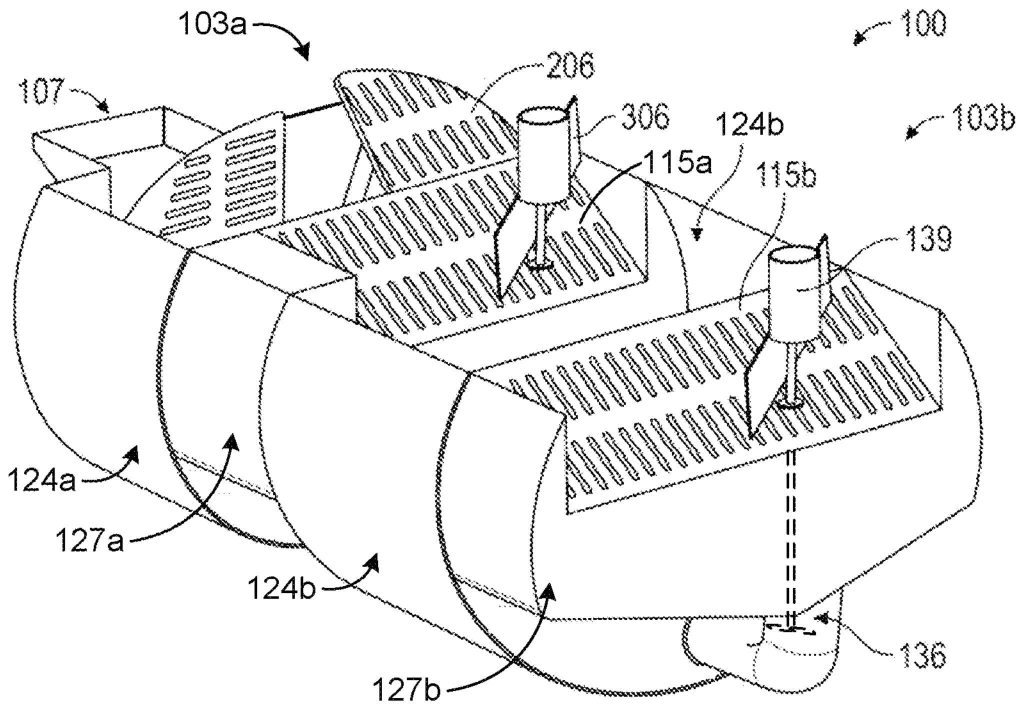
FIG. 4 is a perspective view of the decontamination tank of FIG. 1 according to various embodiments of the present disclosure.

FIG. 4 is a perspective view of the decontamination tank 100 according to various embodiments of the present disclosure. In FIG. 4, the unloader paddles 206 of the first unloader 112*a* (FIG. 1) are shown, but the components including unloader paddles 206 of the second unloader 112*b* (FIG. 1) are omitted for clarity. More clearly illustrated in the perspective view are components including the inlet chute 107, the discharge chute 115*b*, the deflectors 306, and the overflow areas 127*a* and 127*b* of the respective chambers 103*a* and 103*b*. The liquid flow component 136 is contained within the overflow area 127 as shown. The perspective view illustrates how the chambers 103*a* and 103*b* fit in the overall decontamination tank 100 system. While the decontamination tank 100 shows two chambers 103*a* and 103*b*, there can be any number of additional chambers 103.

In this example, the first chamber 103*a* can include or otherwise be fed product 106 through an inlet chute 107. The unloader paddles 206 can lift the product 106 out of the product area 124*a*. The deflector 306 can guide the product 106 over the discharge chute 115*a* and into the product area 124*b*. The discharge chute 115*a* can have holes that allow a liquid 109*a* (FIG. 1) to fall into the overflow area 127*a*, while providing the product 106 into the product area 124*b* of the chamber 103*b*. The chamber 103*b* can treat the product 106 with another liquid 109*b* (FIG. 1). The operation of the components of the chamber 103*b* can proceed as discussed for chamber 103*a*, and as discussed further herein.

Figure 5:
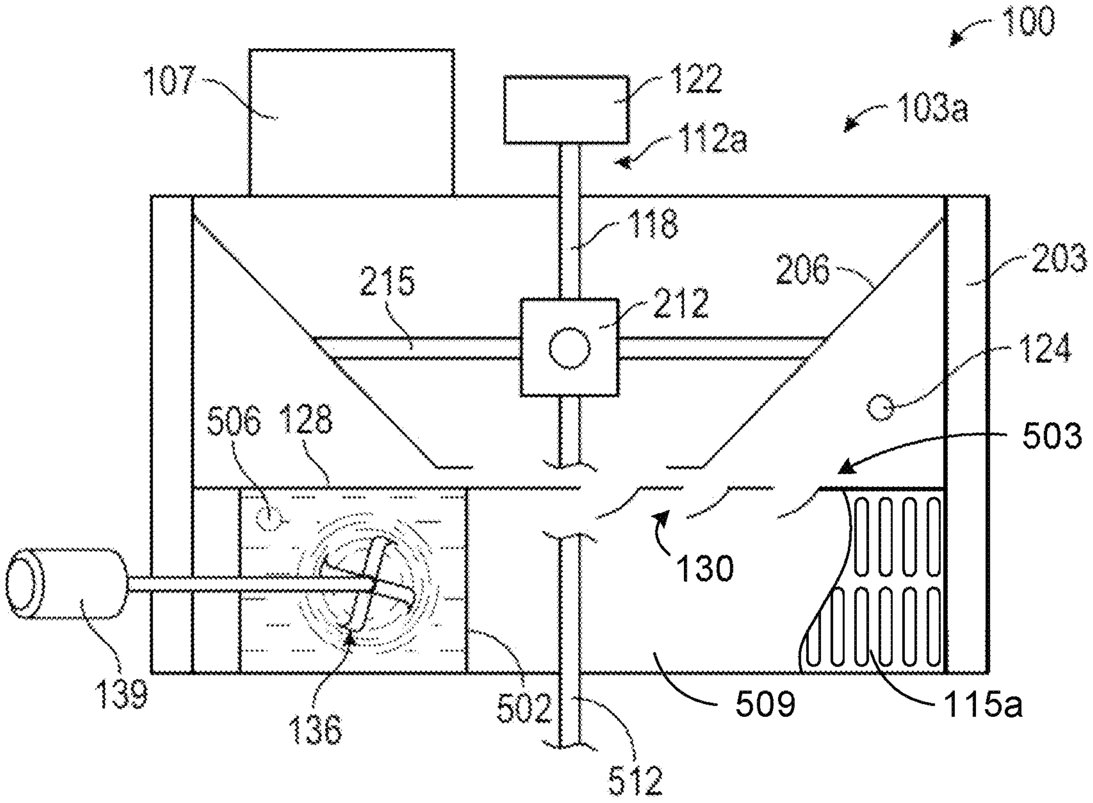
FIG. 5 is a top view into a chamber of a decontamination tank that includes an integrated flow control component according to various embodiments of the present disclosure.

FIG. 5 is a top view into a chamber 103*a* of a decontamination tank 100 that includes an integrated liquid flow component 136 according to various embodiments of the present disclosure. The discharge chute 115*a* is partially hidden, so that the figure can show details of the structure below. In various embodiments, appropriate partitions 128, 502, and 503 may divide a chamber 103 into three areas: a product area 124, a return liquid area 506, and a forced liquid area 509. The return liquid area 506 and the forced liquid area 509 together comprise the overflow area 127 (FIG. 1) discussed previously. The partition 128 separating the product area 127 from the return liquid area 506 has a screen or weir 133 (FIG. 1) that allows liquid 109 to cross from the product area 124 to the return liquid area 506 but blocks product 106 (FIG. 1) from passing. The partition 502 separating the return liquid area 506 from the forced liquid area 509 can be sealed to allow a difference in liquid level between the two areas. This partition 502 can contain a passage through which an impeller of a liquid flow component 136 moves liquid 109 from the return liquid area 506 to the forced liquid area 509. The partition 503 separating the forced liquid area from the product area contains passages 130 that allow liquid 109 (FIG. 1) to flow from the forced liquid area 509 to the product area 124. The passages 130 can be sized, shaped and positioned to direct flow into certain parts of the product area 124 where the liquid 109 will wash over the product 106 to enhance the anti-microbial effect.

The shape and position of passages 130 between the forced liquid area 509 and product area 124 can be significant. In certain parts of the partition 503, the unloader paddle 206 is pressing product 106 against the partition 503. If passages 130 in this area are simple holes that have exposed edges, product 106 may get cut or damaged as the product 106 moves past the passage opening. FIG. 5 illustrates one possible geometry for passages 130 that would minimize exposure of the product 106 to sharp edges. This is analogous to rubbing product 106 on the back side of a cheese grater instead of the cutting side.

The liquid flow component 136 can be a propeller type liquid flow component 136 to move a large volume of liquid 109 against a relatively low discharge head. Such designs can use smaller motors and can be easier to clean.

The coupling shaft 512 portion of the drive shaft 118 of the unloader 112*a* is configured to facilitate attachment to a receiving portion of the hub 212 of the unloader 112*b* (FIG. 1) for the second chamber 103*b* (FIG. 1).

Figure 6:
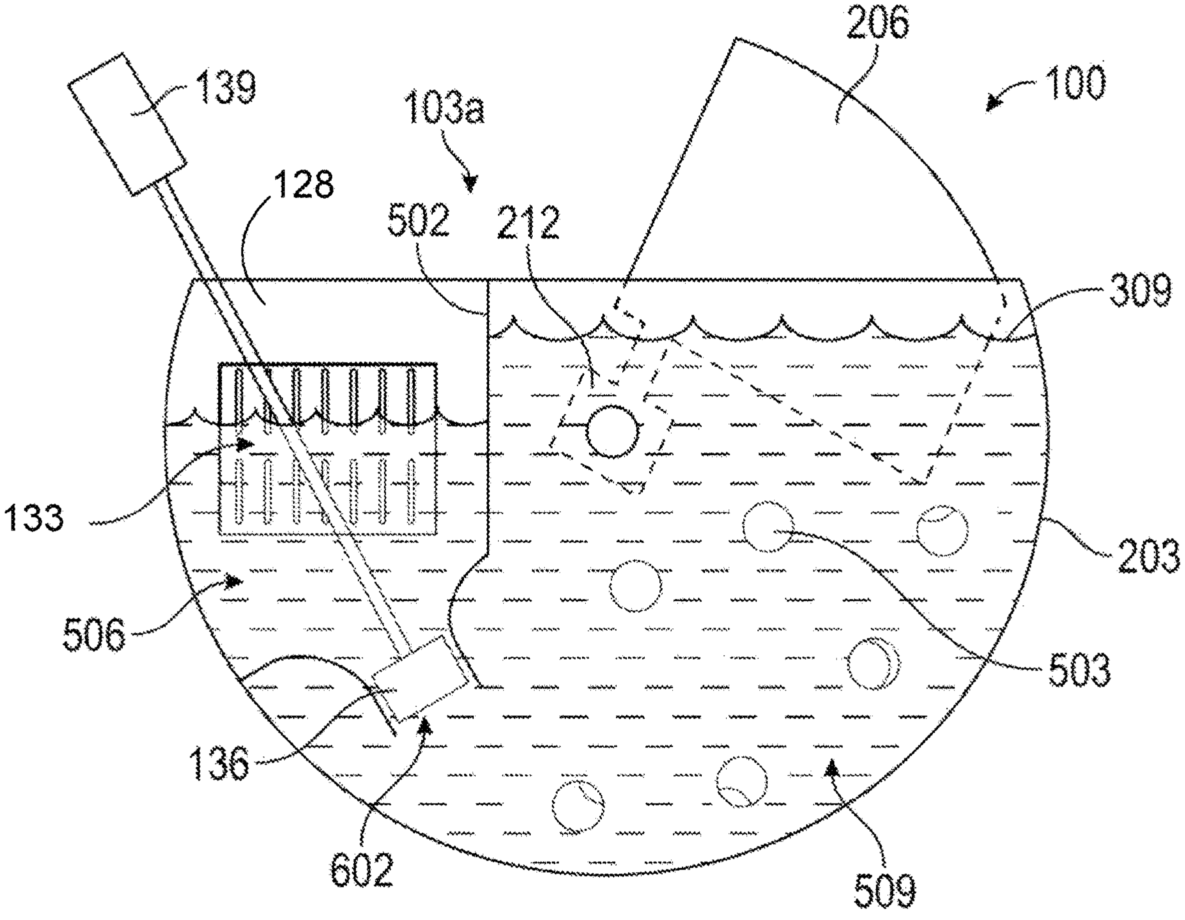
FIG. 6 is a cross-sectional view of the decontamination tank of FIG. 5 through a return liquid area and a forced liquid area according to various embodiments of the present disclosure.

FIG. 6 is a cross-sectional view of the decontamination tank 100 through a return liquid area 506 and a forced liquid area 509 according to various embodiments of the present disclosure. More clearly illustrated in FIG. 6 is the partition 128 with a screen between the product area 124 (FIG. 5) and the return liquid area 509, the partition 502 between the return liquid area 506 and the forced liquid area 509, a passage 602 between the return liquid area 506 and the forced liquid area 509, and the passages 130 between the forced liquid area 509 and the product area 124.

FIG. 7 is a top view of a decontamination tank 700 with a plurality of chambers 103*a* and 103*b* in a side-by-side arrangement according to various embodiments of the present disclosure. The side-by-side arrangement of FIG. 7 is also a rotated arrangement in that the product 106 changes a direction of travel 180 degrees when exiting the first chamber 103*a* and entering the second chamber 103*b*. When the product 106 exits a first discharge chute 115*a* of the first chamber 103*a*, the product 106 is deposited onto a transfer device 703 (e.g., a conveyor, a chute, etc.) to transfer the product 106 to the inlet chute 107*b* of the second chamber 103*b*, where the product 106 receives additional treatment. In some cases, the first and second chambers 103 can be at differing heights so that gravity can transfer the product 106 from the first discharge chute 115*a* to an inlet chute 107*b* of the second chamber 103*b* that is lower than the inlet chute 107*a* of the first chamber 103*a*. Alternatively, the transfer device 703 can have an upward incline of a belt or rollers to propel the product 106 upward into an inlet chute 107*b* that has an entry point higher than an exit point of the first discharge chute 115*a*.

FIG. 8 is a perspective view of the decontamination tank 100 with the addition of sprayers 803*a* and 803*b* for rinsing according to various embodiments of the present disclosure. The respective sprayers 803*a* and 803*b* are for applying a rinsing liquid (e.g., water) to the product 106 as the product 106 exits a respective chamber 103*a* or 103*b*. In this example, the rinsing liquid can drain through the respective discharge chute 115*a*, 115*b* into the respective liquid 109*a* or 109*b* (FIG. 1). Alternatively, the rinsing liquid can drain into a separated catchment so that the rinsing liquid does not drain into the respective liquid 109*a* or 109*b*.

Figure 9:
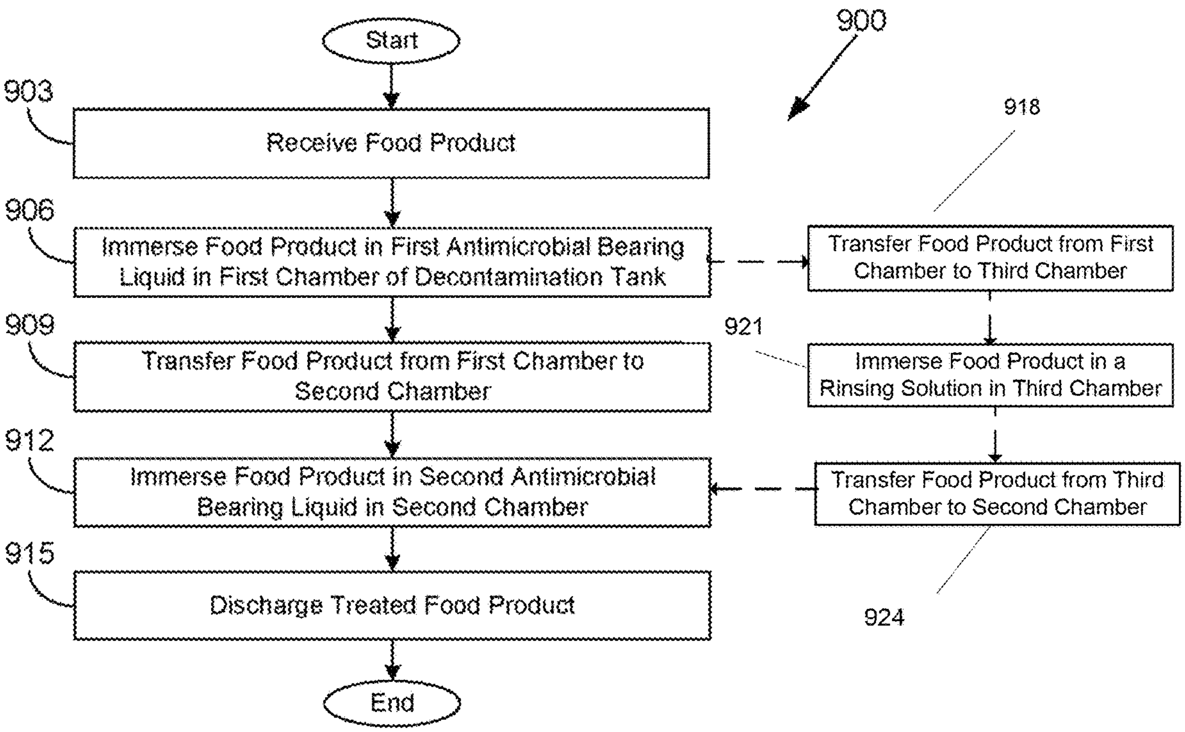
FIG. 9 is a flowchart showing one example method of treating food products using a decontamination tank according to various embodiments of the present disclosure.

Referring next to FIG. 9, shown is a flowchart 900 that provides one example of a method of treating food products 106 using a decontamination tank 100 according to various embodiments. Beginning with box 903, a food product 106 is received at the decontamination tank 100 via an inlet chute 107*a*. In some cases, the food product 106 may have been treated in a chiller, where the chiller has a liquid capacity for chilling the food product 106. In box 906, the food product 106 is immersed in a first antimicrobial bearing liquid 109*a* in a first chamber 103*a* of a plurality of chambers 103 in the decontamination tank 100. For example, the first antimicrobial bearing liquid 109*a* in the first chamber 103*a* can be recirculated by pumping the first antimicrobial bearing liquid 109*a* from a return liquid area 506 to a forced liquid area 509 using a propeller, a pump, or another liquid flow component 136 (FIG. 1). The first antimicrobial bearing liquid 109*a* can then exit the forced liquid area 509 under pressure through a plurality of openings in the second partition 503. The first antimicrobial bearing liquid 109*a* can return from the product area 124 via at least one opening in the first partition 128.

Figure 10:
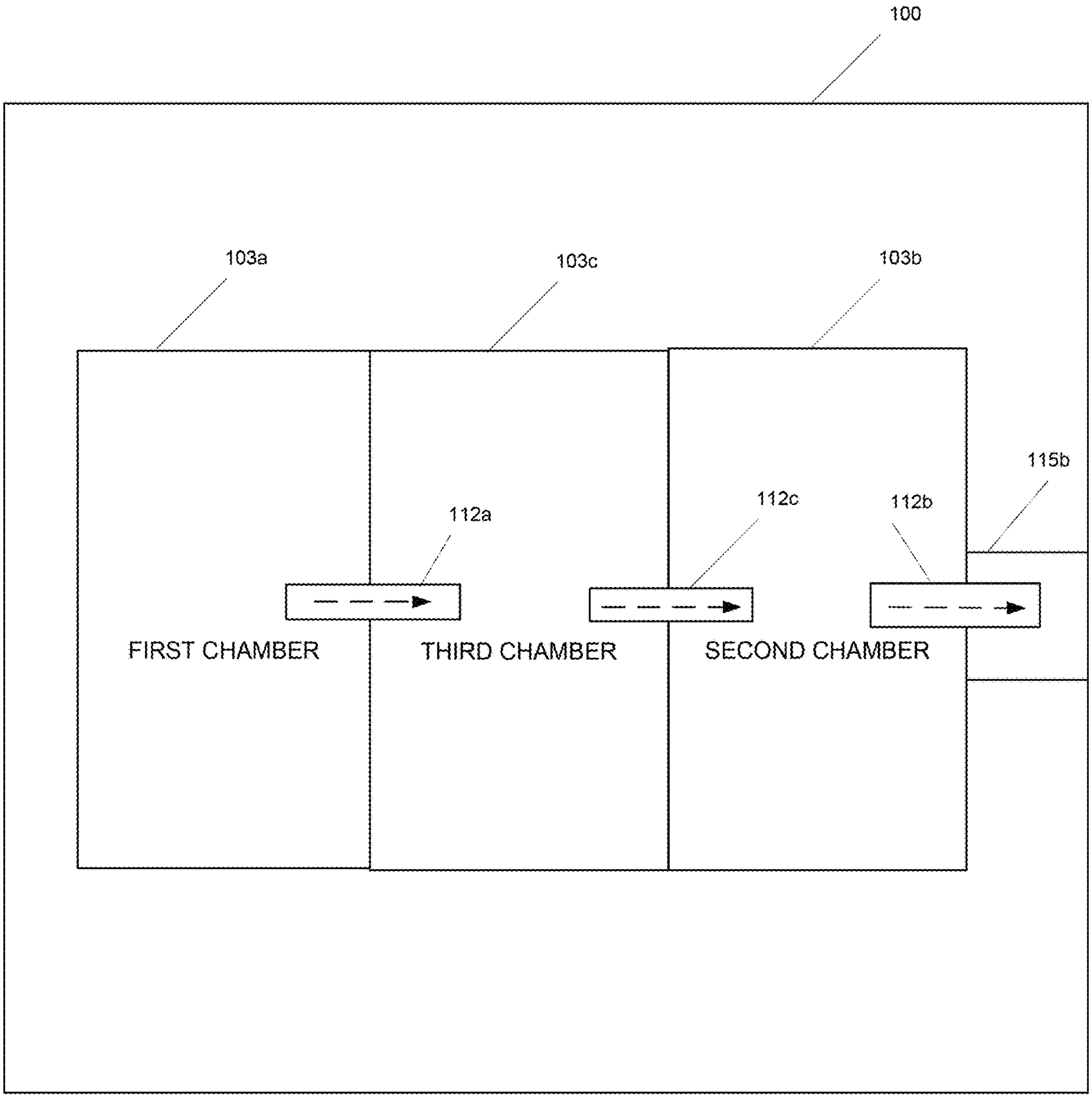
FIG. 10 is a system diagram showing a box diagram of a decontamination tank with three chambers according to various embodiments of the present disclosure.

In box 909, the food product 106 is transferred from the first chamber 103 *a* to the second chamber 103 *b* via an unloader 112 *a*. In some embodiments, the food product 106 can be rinsed via a rinsing solution before the food product 106 is deposited in the second chamber 103 *b*. In one embodiment, the food product 106 is sprayed with the rinsing solution before the food product 106 is deposited in the second chamber 103 *b*. In another embodiment, shown via the dashed line arrows in FIG. 9, the food product 106 is transferred via the unloader 112 *a* in the first chamber 103 *a* to a third chamber 103 *c* of the plurality of chambers in box 918, the food product 106 is immersed in the rinsing solution in the third chamber 103 *c* in box 921, and the food product 106 is transferred via an unloader 112 *c* in the third chamber 103 *c* to the second chamber 103 *b* in box 924. An example of the example embodiments including the third chamber 103 *c* and the third unloader 112 *c* are shown in FIG. 10. In this example, the decontamination tank 100 including the first chamber 103 *a* and first unloader 112 *a*, the second chamber 103 *b* and the second unloader 112 *b*, and the third chamber 103 *c* and the third unloader 112 *c* are shown.

In box 912, the food product 106 is immersed in a second antimicrobial bearing liquid 109*b* in the second chamber 103*b*. For example, the second antimicrobial bearing liquid 109*b* in the second chamber 103*b* can be recirculated by pumping the second antimicrobial bearing liquid 109*b* from a return liquid area 506 to a forced liquid area 509. The second antimicrobial bearing liquid 109*b* can then exit the forced liquid area 509 under pressure through a plurality of openings in the second partition 503. The second antimicrobial bearing liquid 109*b* can return from the product area 127 via at least one opening in the first partition 128. In box 915, the treated food product is discharged. In some cases, the food product 106 can subsequently be treated in a chiller, where the chiller has a liquid capacity for chilling the food product 106. Thereafter, the flowchart 900 ends.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A decontamination tank for treating and reducing microbial contamination of a food product, the decontamination tank comprising:

a first chamber for holding a first antimicrobial bearing liquid for reducing a microbial contamination on a surface of the food product;

a second chamber for holding a second antimicrobial bearing liquid of different content than the first antimicrobial bearing liquid in the first chamber, for further reducing the microbial contamination on the surface of the food product;

a first unloader configured to remove the food product from the first antimicrobial bearing liquid in the first chamber and to deposit the food product toward the second chamber; and a second unloader configured to remove the food product from the second antimicrobial bearing liquid in the second chamber, wherein the first chamber and the second chamber are separated from each other by at least a chamber wall extending to a bottom of the tank and that does not allow for the first antimicrobial bearing liquid or the second antimicrobial bearing liquid to intermix through the chamber wall.

2. The decontamination tank of claim 1, wherein the food product is received from a chiller or discharged to a chiller, the chiller having a liquid capacity for chilling the food product and for containing a liquid solution of water and chemicals in a chemical concentration for reducing the microbial contamination of the food product in which the food product was immersed as the food product passes through the chiller.

3. The decontamination tank of claim 2, wherein the first chamber and the second chamber have a smaller liquid capacity than the liquid capacity of the chiller.

4. The decontamination tank of claim 2, wherein the first antimicrobial bearing liquid and the second antimicrobial bearing liquid have different content than the liquid solution in the chiller.

5. The decontamination tank of claim 1, wherein both the first unloader and the second unloader are driven by a common driveshaft.

6. The decontamination tank of claim 1, further comprising one or more nozzles configured to apply a liquid to rinse or neutralize the first antimicrobial bearing liquid after the food product is removed from the first antimicrobial bearing liquid in the first chamber and before the food product is deposited into the second antimicrobial bearing liquid in the second chamber.

7. The decontamination tank of claim 1, further comprising:

a third chamber interposed between the first chamber and the second chamber, the third chamber holding a liquid to rinse or neutralize the first antimicrobial bearing liquid after the food product is removed from the first antimicrobial bearing liquid in the first chamber and before the food product is deposited into the second antimicrobial bearing liquid in the second chamber;

a third unloader configured to remove the food product from the liquid in the third chamber and to deposit the food product toward the second chamber; and wherein the first unloader deposits the food product toward the third chamber.

8. The decontamination tank of claim 1, wherein the first chamber and the second chamber are oriented axially in series.

9. The decontamination tank of claim 1, wherein the first chamber and the second chamber are oriented laterally.

10. The decontamination tank of claim 1, wherein the first antimicrobial bearing liquid comprises an antimicrobial agent selected from the group consisting of peracetic acid (PAA), cetylpyridinium chloride (CPC), chlorine, ozone, and salt, wherein the second antimicrobial bearing liquid comprises a different antimicrobial agent selected from the group, and the first antimicrobial bearing liquid excludes the different antimicrobial agent.

11. The decontamination tank of claim 1, wherein a rotational speed of the first unloader and a rotational speed of the second unloader may be independently controlled based on one or more characteristics of the first antimicrobial bearing liquid and the second antimicrobial bearing liquid.

12. A method for treating and reducing microbial contamination of a food product, comprising:

immersing the food product in a first antimicrobial bearing liquid in a first chamber of a decontamination tank having a plurality of chambers;

transferring the food product via an unloader in the first chamber to a second chamber of the plurality of chambers; and immersing the food product in a second antimicrobial bearing liquid in the second chamber, the second antimicrobial bearing liquid being of different content than the first antimicrobial bearing liquid in the first chamber, wherein the first chamber and the second chamber are separated from each other by at least a chamber wall extending to a bottom of the tank and that does not allow for the first antimicrobial bearing liquid or the second antimicrobial bearing liquid to intermix through the chamber wall.

13. The method of claim 12, further comprising treating the food product in a chiller before immersing the food product in the first antimicrobial bearing liquid or after immersing the food product in the second antimicrobial bearing liquid, the chiller having a liquid capacity for chilling the food product.

14. The method of claim 12, wherein transferring the food product via the unloader in the first chamber to the second chamber further comprises rinsing the food product via a rinsing solution before depositing the food product in the second chamber.

15. The method of claim 14, wherein rinsing the food product via the rinsing solution further comprises spraying the food product with the rinsing solution before depositing the food product in the second chamber.

16. The method of claim 14, wherein rinsing the food product via the rinsing solution further comprises:

transferring the food product via the unloader in the first chamber to a third chamber of the plurality of chambers;

immersing the food product in the rinsing solution in the third chamber; and transferring the food product via an unloader in the third chamber to the second chamber.

17. The method of claim 12, wherein at least one of the first chamber or the second chamber is divided into a product area, a return liquid area, and a forced liquid area, the at least one of the first chamber or the second chamber including a first partition between the product area and the return liquid area and a second partition between the product area and the forced liquid area, the first and second partitions preventing the food product from entering the return liquid area or the forced liquid area; and the method further comprises recirculating a respective antimicrobial bearing liquid in the at least one of the first chamber or the second chamber by causing the respective antimicrobial bearing liquid to flow from the return liquid area to the forced liquid area, the respective antimicrobial bearing liquid exiting the forced liquid area under pressure through a plurality of openings in the second partition, the respective antimicrobial bearing liquid returning from the product area via at least one opening in the first partition.

* * * * *